April 5, 1949.  B. E. LUBOSHEZ  2,466,455
REFLECTING MEANS FOR FOLDING THE LIGHT
PATH IN OPTICAL SYSTEMS
Filed March 30, 1946  2 Sheets-Sheet 1
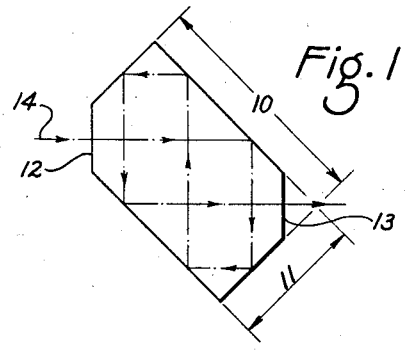
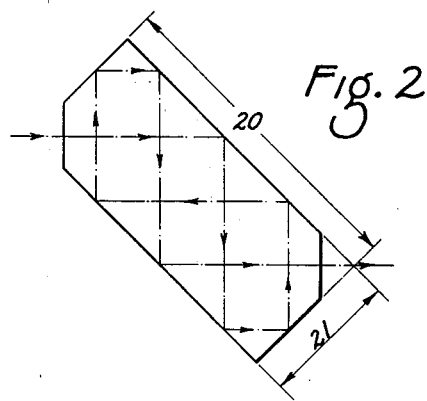
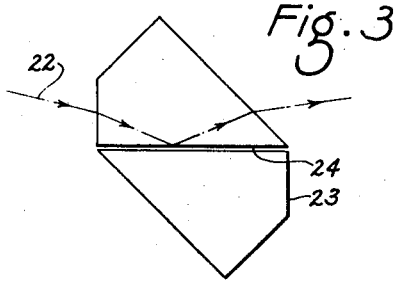
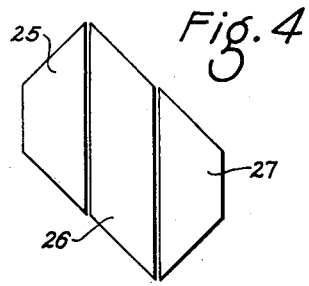
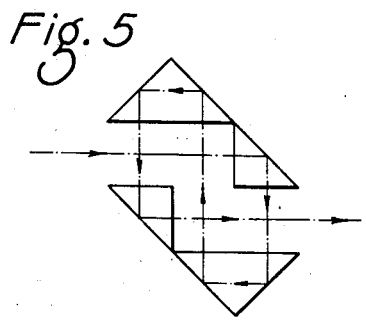
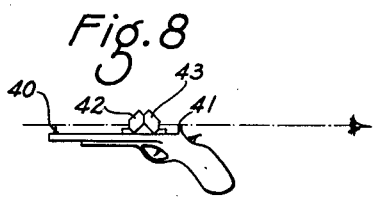
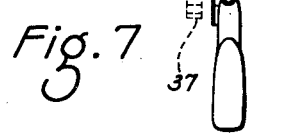
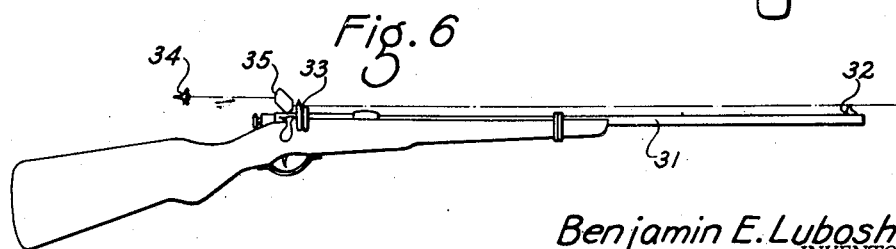
Benjamin E. Luboshez
INVENTOR
BY
ATT'Y. & AG'T.

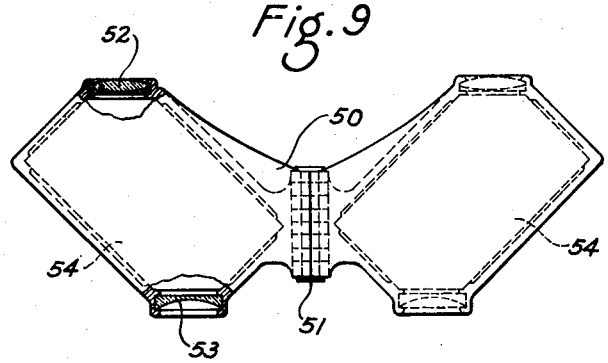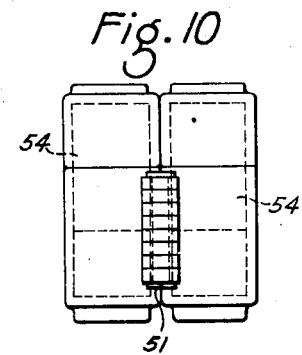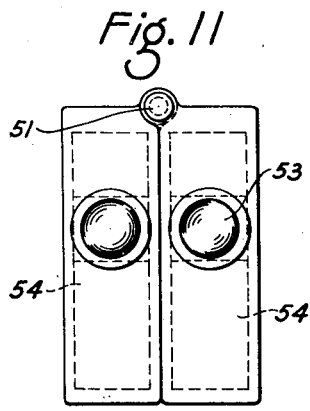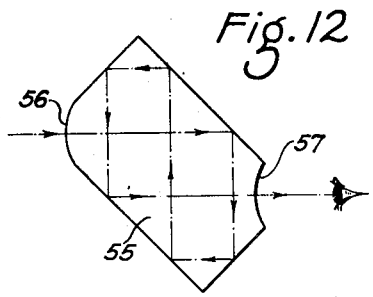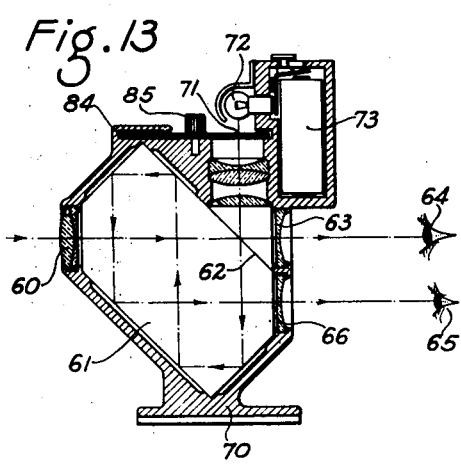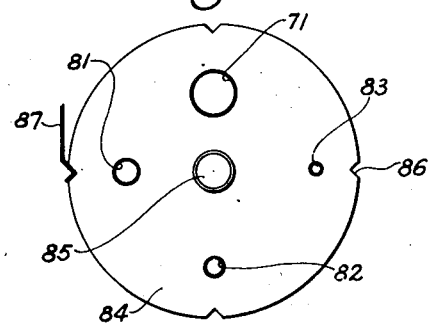

Patented Apr. 5, 1949

2,466,455

UNITED STATES PATENT OFFICE 2,466,455

REFLECTING MEANS FOR FOLDING THE LIGHT PATH IN OPTICAL SYSTEMS

Benjamin E. Luboshez, Rochester, N. Y., assignor to Eastman Kodak Company, Rochester, N. Y., a corporation of New Jersey Application March 30, 1946, Serial No. 658,382

12 Claims. (Cl. 88—1)

This invention relates to optical systems and particularly to prisms for use in optical systems.

In many optical systems such as telescopes, binoculars, and gunsights, it is desirable to have a long optical path without the inconvenience of unnecessary over-all length. The primary object of the present invention is to provide a prism of relatively small over-all dimensions, but with an inherently long optical path. In this general connection, cross reference should be made to my copending applications Serial Nos. 658,383, 658,384, and 658,385 filed concurrently herewith.

An object of one embodiment of my invention is to provide a gunsight in which there is sufficient separation of the front and rear fiducial members to insure accurate aim and at the same time there is sufficient distance between the eye of the operator and the rear fiducial member to permit optical accommodation of both fiducial members and the target simultaneously.

It is an object of a different, highly preferred embodiment of the invention to provide compact but high-powered binoculars.

The prism according to the invention comprises a rectangular block of glass or other light transparent material whose length is greater than its width and is an odd multiple of ⅓ of its width. That is, the length is ⅝, ⅞, ⅚, etc. of its width. The thickness of the block is not critical but to have it about the same aperture in both directions or azimuths, the thickness should be about $\sqrt{2}$ of its width. Any rectangular block has twelve edges. In the present invention two opposite edges of the block, specifically two of the short edges which are perpendicular to the largest face of the block, are beveled to form approximately square entrance and exit faces. These faces are parallel to each other and are at 45° to the ends and sides of the block. As will be pointed out later the optic axis through this block lies entirely in a single plane. In the case where the length of the block is ⅝ of its width, the entrance and exit faces are separated by the $\sqrt{2}$ times the width, but the optic axis inside the glass is 4⅔ times as long as this separation. The index of refraction must of course be taken into account if the effective path length is being computed.

Broadly the invention merely requires four reflecting surfaces arranged as the sides and ends of a rectangular block so as to reflect the light along the uni-planar path required by the invention. The effect is substantially the same whether the medium inside the reflecting surfaces is air or glass, but of course the solid prism has many advantages from a manufacturing point of view.

In gunsights it is customary to use two fiducial members mounted on the gun in alignment with the bore of the gun, with or without adjustment for superelevation etc. It is usually relatively easy to keep the front fiducial member and the target simultaneously in focus, both being a sufficient distance from the eye. However, if the rear fiducial is placed sufficiently far from the eye position so that it too is accommodated in the normal focus of the eye, the distance between the two fiducial members is so short that accuracy of aim is impaired. According to the invention a long path prism is optically aligned between the rear fiducial member and the eye position so that both members are at sufficient distance from the eye to be focused simultaneously. Alternatively a prism is placed in optical alignment between the fiducial members which are then held at sufficient distance from the eye to be accommodated simultaneously. In both cases the prism is between the eye position and the front fiducial member. Accuracy with which the prism is made and mounted is of critical importance when the prism is between the fiducial members, but a relatively inexpensive prism, inexpensively mounted, may be used between the rear fiducial member and the eye. The invention is applicable directly to Galilean telescopes or binoculars by placing the prism between the objective and the negative eyepiece. In the case of binoculars this provides a high power viewer which is relatively compact especially when both parts are arranged to have the prisms parallel to each other; this is particularly compact when folded for carrying. The copending applications referred to above relate to modifications of this prism including those applicable to terrestrial telescopes.

The operation of the invention and its various embodiments will be fully understood from the following description when read in connection with the accompanying drawings in which:

Fig. 1 is a plan view of a prism according to one embodiment of the invention.

Figs. 2 to 5 similarly show other embodiments of the invention.

Fig. 6 illustrates a rifle having a gunsight according to one embodiment of the invention.

Fig. 7 is a rear view of the embodiment shown in Fig. 6.

Fig. 8 similarly shows a different embodiment of the invention applied to the gunsight of a pistol.

Fig. 9 is a top view partly cut away of collapsible binoculars according to one embodiment of the invention.

Figs. 10 and 11 are respectively top and end views of the binoculars shown in Fig. 9, when folded for carrying.

Fig. 12 shows a modification of the prism shown in Fig. 1.

Fig. 13 is an elevation in cross section of a duplex telescopic system specifically for use as a telescopic gunsight.

Fig. 14 is a plan view of the reticle disc used with the gunsight shown in Fig. 13.

In Fig. 1 the length 10 of the block of glass is 5/3 of the width 11. Opposite edges 12 and 13 are beveled to act as entrance and exit faces for a light beam whose optic axis is shown by broken line 14. It will be noted that the optic axis suffers six reflections before it emerges from the exit face 13 parallel to the direction in which it entered the face 12. In the plane of the drawing the faces 12 and 13 have a width equal to $$\frac{\sqrt{2}}{3}$$

times the width 11, and the block thickness should preferably equal this, but this thickness is not critical to the invention. In fact both dimensions of the entrance and exit faces may be less without seriously affecting anything but the optical efficiency of the system.

As shown in Fig. 2, a still further advantage can be gained by making the length 20 equal to 7/8 times the width 21, in which case the optic axis suffers eight reflections in the block of glass. For convenience in manufacture the prism may be made up of a plurality of parts as illustrated in Figs. 3, 4, and 5. Each of these arrangements permits lenses or other optical units to be placed in the path of the light beam at locations which would otherwise be inside the glass block. The arrangement shown in Fig. 3 has the added advantage that an oblique ray of light 22 entering the prism does not emerge from the exit face 23 but is totally internally reflected at the airspace 24, so that it passes harmlessly to one side. Cross reference to Fig. 1 will indicate that the principal light beam passes through this airspace 24 normally i. e. perpendicularly each time that it encounters the airspace.

Similarly in Fig. 4 the combination of three prisms 25, 26, and 27 simplifies manufacture of the device and provides only airspaces which are orthogonal to the optic axis. Fig. 5 shows a simple arrangement of four right angle or Porro prisms which leaves considerable space in the optical path for the introduction of optic elements such as lenses. This latter embodiment is particularly convenient to manufacture from relatively small prisms.

In Fig. 6 a rifle 31 is provided with a front fiducial member 32 and a rear fiducial member 33 relatively close to the eye position 34. According to the invention there is located between the fiducial member 33 and the eye position 34 a long path prism 35 which increases the distance between the eye and the fiducial members without decreasing the separation of the fiducial members. As shown particularly in Fig. 7 this long path prism 35 is hinged at 36 so that it may be swung out of the way to the position shown by the broken lines 37 when one desires to use the gunsight directly without the benefit of the prism 35. In this arrangement the quality of the prism 35 is not at all critical since the aiming of the gun depends entirely on alignment of the members 33, 32 and the target. The arrangement shown in Fig. 8 on the other hand is particularly adaptable to pistols which are normally fired at arm's length so that there is no difficulty in simultaneously focusing on both fiducial members. However, the members 40 and 41 are not sufficiently spaced to insure precise aim. According to the invention two long path prisms 42 and 43 are optically aligned between the fiducial members 40 and 41, two prisms being used so as to compensate the offset of the optical path caused by a single prism according to the invention. In this arrangement the quality of the prisms is relatively critical since the controlling part of the light path, i. e. the part between the fiducial members passes through the prisms.

In Fig. 9 a simple binocular having a housing 50 is made of two parts hinged about the hinge 51, so that the two parts may be folded against each other for carrying. Each part constitutes a Galilean telescope having an objective 52 and a negative eyepiece 53, the path length between the objective and eyepiece being increased, according to the invention, by a long path prism 54 similar to that shown in Fig. 1. The long optical path permits the use of a long focal length objective with the resulting high power. Simultaneously the flat prisms 54, especially when folded to the carry position as shown in Figs. 10 and 11 provide a very compact instrument quite convenient for carrying in a coat pocket or lady's pocketbook. Although I prefer to supply instruments in two or three sizes to accommodate the usual range of differences in interocular separation, a simple adjustment of interocular separation may be accomplished by rotating the parts about the hinge 51, to any desired setting.

Because of the long optical path introduced by the prism, it is possible to obtain high magnification telescopic systems with only simple lenses. In fact, an eminently satisfactory system where low cost is important, employs a molded prism 55 such as shown in Fig. 12 with the entrance face 56 molded convex to act as the objective and the exit face 57 molded concave to act as the eyepiece. Since the surfaces are molded they may be made aspheric to correct aberrations in the usual way.

A duplex telescopic system i. e. one having two alternatively available powers is illustrated in Fig. 13 wherein the light passes through an objective 60 and a prism 61 according to the invention, which has a semi-transparent surface 62 directly in line with the objective. Light passing directly through the surface 62 is collimated by the eyepiece 63 and passes at relatively low magnification to the eye 64 of the observer. Alternatively, if the observer moves his eye to the position 65, he receives the light reflected first at the semi-transparent surface 62 and then five more times inside the prism 61 before it emerges through the eyepiece 66. This particular arrangement as illustrated is used as a telescopic gunsight, means being provided for attaching the mount 70 to a rifle. When used as a gunsight the advantages of a so-called "infinity sight" are gained by using a reticle 71 illuminated by a lamp 72 which is powered from a simple flash light cell 73. Light from a reticle 71 is collimated or more exactly is brought to match the vergency (convergence) of the light from the objective 60. That is, the two beams when combined are converging toward the same point. This reticle beam is either reflected by the surface 62 to the eyepiece 63 or is transmitted by the surface 62 to travel through the long path prism to the eyepiece 66. The reticle 71 is in the form of a ring which may be used for stadiametric ranging when the target or some part thereof has a known dimension. For example, a gunner can usually visualize something at the target having a six-foot dimension. Four different reticle rings 71, 81, 82, and 83 as shown in Fig. 14 are in the form of transparent markings on an opaque disc 84. Rotation of the disc by knob 85 brings into proper alignment whichever reticle ring is desired. The disc 84 is provided with notches 86 which engage a spring detent 87 so that whichever reticle ring is selected, stays in alignment. When the target is near at hand, a large reticle ring is selected whose diameter matches six feet of the target as seen in the telescope, the most distant targets on the other hand requiring the small reticle ring 81. It will be noted that the center of the largest reticle 71 is nearest to the center of the disc 84 and the centers of the other three reticle rings are consecutively more distant from the center. When firing at a distant target the gun itself should point somewhat upward, so as to have superelevation while the reticle itself is on target and the line of sight is straight toward the target. Thus the difference in the distance of the reticle marks from the center of the disc, provides superelevation as required.

It is to be understood that the present invention is not limited to the embodiments shown but is of the scope of the appended claims.

I claim:

1. A prism for increasing optical path length comprising a block of light transmitting material with eight faces, the two largest faces being plane, parallel, substantially identical in shape, area and orientation, and each shaped as a rectangle with two opposite corners cut off, at approximately 45° to the sides and ends of the rectangle, and said two faces being referred to as horizontal and separated by the height of the block, the width of said rectangle being about $$\frac{3}{\sqrt{2}}$$

times said height, the length of said rectangle being greater than said width and being an odd multiple of ⅓ of said width, the two faces joining the sides of said top and bottom being vertical, plane, parallel and internally reflecting, the two faces joining the ends of said top and bottom also being vertical, plane, parallel and internally reflecting and perpendicular to the side faces, and the two faces joining the cut off corners of said top and bottom being approximately square, light transmitting entrance and exit faces.

2. A prism according to claim 1 in which the entrance and exit faces are also plane and parallel.

3. A prism according to claim 1 in which the entrance face is convex and the exit face is concave.

4. An optical sighting device for sighting an object from an eye position, in the same horizontal plane as the object, comprising a support, light entrance defining means and light exit defining means carried vertically by the support for transmitting light from the object to the eye position and a prism carried by the support between the entrance and exit defining means, consisting of a block of light transmitting material with eight faces, the top and bottom faces being the largest, being horizontal, plane, parallel, substantially identical in shape, and each shaped as a rectangle with two opposite corners, adjacent the entrance and exit defining means, cut off at 45° to the sides and ends of the rectangle, the distance between the top and bottom being referred to as the height of the block, the width of said rectangle being about $$\frac{3}{\sqrt{2}}$$

times said height, the length of said rectangle being greater than said width and being an odd multiple of ⅓ of said width, the two faces joining the sides of said top and bottom being vertical, plane, parallel and internally reflecting, the two faces joining the ends of said top and bottom also being vertical, plane, parallel and internally reflecting and perpendicular to the side faces, and the two faces joining the cut off corners of said top and bottom being approximately square, light transmitting entrance and exit faces, adjacent to said entrance and exit defining means.

5. An optical sighting device according to claim 4 for use as a gun sight, said support being a gun having two fiducial members carried by the gun aligned for proper aiming of the gun, the prism being carried by said support between the eye position and the front fiducial member which constitutes the object to be sighted.

6. An optical sighting device according to claim 4 for use as a gun sight, said support being a gun having two fiducial members carried by the gun aligned for proper aiming of the gun, the prism being carried by said support between the eye position and the rear fiducial member, the two fiducial members constituting the object to be sighted.

7. An optical sighting device according to claim 4 in which light said entrance defining means includes an objective with its optic axis horizontal and said light exit defining means includes a negative eyepiece for receiving light from the prism and for passing it to the eye position.

8. An optical sighting device according to claim 4 in which the entrance face of the prism is convex toward the incident light from the object to have positive dioptric power and the exit face of the prism, forming part of said light exit defining means, is concave toward the eye position to have negative dioptric power.

9. An optical sighting device according to claim 4 which said support consists of a housing of two parts hinged together, one part of which contains said prism and the other part of which contains a similar prism for viewing the same object, the two prisms transmitting light to adjacent eye positions for binocular viewing.

10. An optical sighting device according to claim 4 in which said light entrance defining means includes an objective with its optic axis horizontal, said light exit defining means includes an eyepiece for receiving light horizontally after at least six reflections in the prism and for transmitting it to the eye position, said objective and eyepiece forming a relatively high power telescopic system, the side face of the prism in direct alignment with the light entrance defining means being semi transmitting, only the reflected part of the beam passing through said high power telescopic system, the transmitted part continuing in said horizontal plane without passing through said light exit defining means.

11. An optical sighting device according to claim 10 in which a second eyepiece is included adjacent to the first and directly aligned with the objective to receive the light transmitted by said semi transmitting reflecting surface to constitute with the objective a relatively low power telescopic system.

12. An optical sighting device according to claim 10 in which the semi transmitting reflecting surface acts both as a beam splitter and a beam combiner for super imposing a secondary light beam on the telescopic system and including means for forming said secondary light beam with the same vergency as the telescopic system beam at the semi transmitting reflecting surface.

BENJAMIN E. LUBOSHEZ.

REFERENCES CITED

The following references are of record in the file of this patent:

UNITED STATES PATENTS

| Number | Name | Date |
|---|---|---|
| 547,243 | Calvin | Oct. 1, 1895 |
| 683,204 | Grubb | Sept. 24, 1901 |
| 869,769 | Bell | Oct. 29, 1907 |
| 874,049 | Borsch | Dec. 17, 1907 |
| 989,852 | Koscinski | Apr. 18, 1911 |
| 1,227,544 | Lobdell | May 22, 1917 |
| 1,719,443 | Nichterlein | July 2, 1929 |
| 1,961,706 | Pajes | June 5, 1934 |
| 2,195,168 | Foster | Mar. 26, 1940 |
| 2,387,838 | French | Oct. 30, 1945 |

FOREIGN PATENTS

| Number | Country | Date |
|---|---|---|
| 30,925 | Great Britain | Dec. 31, 1897 |
| 11,556 | Great Britain | 1899 |
| 287,842 | Germany | Oct. 8, 1915 |
| 485,337 | France | Oct. 8, 1917 |
| 152,381 | Great Britain | Aug. 17, 1920 |
| 297,106 | Italy | June 4, 1932 |
| 692,755 | Germany | June 26, 1940 |
| 702,662 | Germany | Feb. 13, 1941 |